US012524758B2

(12) United States Patent
Carey et al.

(10) Patent No.: US 12,524,758 B2
(45) Date of Patent: Jan. 13, 2026

(54) SYSTEMS AND METHODS FOR ISSUING AND USING DEDICATED TOKENS FOR REWARDS ACCOUNTS

(71) Applicant: JPMORGAN CHASE BANK, N.A., New York, NY (US)

(72) Inventors: David Christopher Carey, Middletown, DE (US); Sangameswara Rao Panchomarthi, Bear, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 73 days.

(21) Appl. No.: 18/604,141

(22) Filed: Mar. 13, 2024

(65) Prior Publication Data
US 2024/0220970 A1    Jul. 4, 2024

Related U.S. Application Data

(63) Continuation of application No. 17/084,288, filed on Oct. 29, 2020, now abandoned.
(Continued)

(51) Int. Cl.
| | |
|---|---|
| G06Q 20/36 | (2012.01) |
| G06Q 20/40 | (2012.01) |
| G06Q 30/0207 | (2023.01) |
| G06Q 40/03 | (2023.01) |
| H04L 9/40 | (2022.01) |

(52) U.S. Cl.
CPC ..... *G06Q 20/3676* (2013.01); *G06Q 20/3672* (2013.01); *G06Q 20/3678* (2013.01); *G06Q 20/4037* (2013.01); *G06Q 30/0215* (2013.01); *G06Q 40/03* (2023.01); *H04L 63/0853* (2013.01)

(58) Field of Classification Search
None
See application file for complete search history.

(56) References Cited

U.S. PATENT DOCUMENTS

| | | |
|---|---|---|
| 8,046,256 B2 | 10/2011 | Chien et al. |
| 11,423,395 B1 | 8/2022 | Kurani et al. |

(Continued)

OTHER PUBLICATIONS

International Search Report, dated Dec. 2, 2021, from corresponding International Application No. PCT/US2020/058325.
(Continued)

*Primary Examiner* — David P Sharvin
(74) *Attorney, Agent, or Firm* — GREENBERG TRAURIG LLP (57) ABSTRACT

Systems and methods for issuing and using dedicated tokens for rewards accounts are disclosed. In one embodiment, in a token service provider information processing apparatus comprising at least one computer processor, a method for issuing dedicated tokens for reward accounts may include: (1) receiving, from an electronic wallet, a request to provision a credit or debit-based token for a financial instrument and a dedicated reward-based token for rewards-based transactions associated with the financial instrument to an electronic wallet; (2) generating the credit or debit-based token and the dedicated reward-based token; and (3) providing the credit or debit-based token and the dedicated reward-based token to the electronic wallet and to the issuing bank.

20 Claims, 4 Drawing Sheets

Related U.S. Application Data

(60) Provisional application No. 62/928,172, filed on Oct. 30, 2019.

(56) References Cited

U.S. PATENT DOCUMENTS

| | | |
|---|---|---|
| 2013/0325579 A1 | 12/2013 | Salmon et al. |
| 2015/0319158 A1 | 11/2015 | Kumnick |
| 2017/0249622 A1* | 8/2017 | Ortiz .................. G06Q 20/40 |
| 2017/0270557 A1 | 9/2017 | Maenpaa et al. |
| 2018/0276654 A1* | 9/2018 | Chatterjee .......... G06Q 20/405 |
| 2019/0164155 A1* | 5/2019 | Hosp ................ G06Q 20/3821 |
| 2020/0027116 A1 | 1/2020 | Royyuru et al. |
| 2021/0056579 A1 | 2/2021 | Chatterjee et al. |

OTHER PUBLICATIONS

Written Opinion of the International Searching Authority, dated Dec. 2, 2021, from corresponding International Application No. PCT/US2020/058325.

* cited by examiner

SYSTEMS AND METHODS FOR ISSUING AND USING DEDICATED TOKENS FOR REWARDS ACCOUNTS

RELATED APPLICATIONS

This application is a Continuation of U.S. Patent Application Ser. No. 17/084,288, filed Oct. 29, 2020, which claims priority to, and the benefit of, U.S. Provisional Patent Application Ser. No. 62/928,172 filed Oct. 30, 2019, the disclosure of each of which is hereby incorporated, by reference, in its entirety.

BACKGROUND OF THE INVENTION

1. Field of the Invention

Embodiments generally relate to systems and methods for issuing and using dedicated tokens for rewards accounts.

2. Description of the Related Art

Customers making P2P payments using digitals wallet are constrained to make payments using currency transfer, charging a credit card, etc. Customers do not have a seamless mechanism to transact at merchants with reward points instead of their available credit or DDA balance. At the same time, Merchants do not typically want an intrusively complex bespoke integration with issuing banks to enable a seamless pay with reward points transaction.

SUMMARY OF THE INVENTION

Systems and methods for issuing and using dedicated tokens for rewards accounts are disclosed. In one embodiment, in a token service provider information processing apparatus comprising at least one computer processor, a method for issuing dedicated tokens for reward accounts may include: (1) receiving, from an electronic wallet, a request to provision a credit or debit-based token for a financial instrument and a dedicated reward-based token for rewards-based transactions associated with the financial instrument to an electronic wallet; (2) generating the credit or debit-based token and the dedicated reward-based token; and (3) providing the credit or debit-based token and the dedicated reward-based token to the electronic wallet and to the issuing bank.

In one embodiment, the request to provision the credit or debit-based token and the dedicated reward-based token for rewards-based transactions to an electronic wallet may include a first request to provision the credit or debit-based token and a second request to provision the dedicated reward-based token for rewards-based transactions. The first request may include an account number for the financial instrument.

In one embodiment, the method may further include providing the account number for the financial instrument to the issuing bank of the financial instrument; and receiving an indication that the financial instrument is eligible for the dedicated reward-based token from the issuing bank of the financial instrument.

In one embodiment, the credit or debit-based token and the dedicated reward-based token may each have a different Bank Identification Number (BIN). The BIN for the dedicated reward-based token may identify the account as a rewards account to the issuing bank.

In one embodiment, the method may further include storing a mapping of the credit or debit-based token and the dedicated reward-based token to the financial instrument. The issuing bank may also store the mapping of the credit or debit-based token and the dedicated reward-based token to the financial instrument in a second token vault.

In one embodiment, the token service provider and the issuing bank of the financial instrument may be part of the same entity.

In one embodiment, the token service provider information processing apparatus may further identify the dedicated reward-based token as a secondary token.

In one embodiment, the issuing bank may store an indicator with the dedicated reward-based token to the financial instrument in a second token vault, wherein the indicator identifies the dedicated reward-based token to the financial instrument as a rewards-based token.

According to another embodiment, in an issuing bank information processing apparatus comprising at least one computer processor, a method for conducting a transaction using a dedicated reward points-based token may include: (1) receiving, from a card association, a transaction authorization for a pending transaction with a merchant comprising an account number mapped to a token received from an electronic wallet, the electronic wallet provisioned with a credit or debit-based token and a dedicated reward-based token; (2) identifying the token as the dedicated reward-based token; (3) authorizing the pending transaction against available reward points for a rewards account associated with the account number; and (4) completing the transaction.

In one embodiment, the issuing bank may charge the transaction against the available reward points.

In one embodiment, the issuing bank may charge a remaining balance after applying the available rewards points to an account associated with the credit or debit-based token.

In one embodiment, the credit or debit-based token and the dedicated reward-based token may each have a different Bank Identification Number (BIN), and the token may be identified as the dedicated reward-based token based on its BIN.

In one embodiment, the dedicated reward-based token may be identified as the dedicated reward-based token based on an identifier stored in a token vault for the issuing bank.

In one embodiment, the transaction may be settled by the issuing bank providing the merchant with a transaction amount for the completed transaction minus fees.

In one embodiment, the token may not indicate to the merchant that it is the dedicated rewards-based token.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for issuing and using dedicated tokens for rewards accounts.

Embodiments may create tokens from loyalty based products (credit and debit) from a plurality of providers that may be used as part of a standard authorization process; however, the issuing bank will process the transaction against available reward points. If the authorization amount exceeds the value of reward points, the issuing bank will debit a demand deposit account or a credit balance appropriately. The merchant, for all intents and purposes, is oblivious to the underlying points mechanic and process the transaction as a typical "tap to pay" transaction.

In embodiments, the tokens may be used for "Card on File" transactions, as well as for electronic wallet-based transactions. For example, a card on file merchant (e.g., a streaming service provider that charges a credit card each month) may present the customer with the choice of having a reward points credential in their merchant wallet as well.

Figure 1:
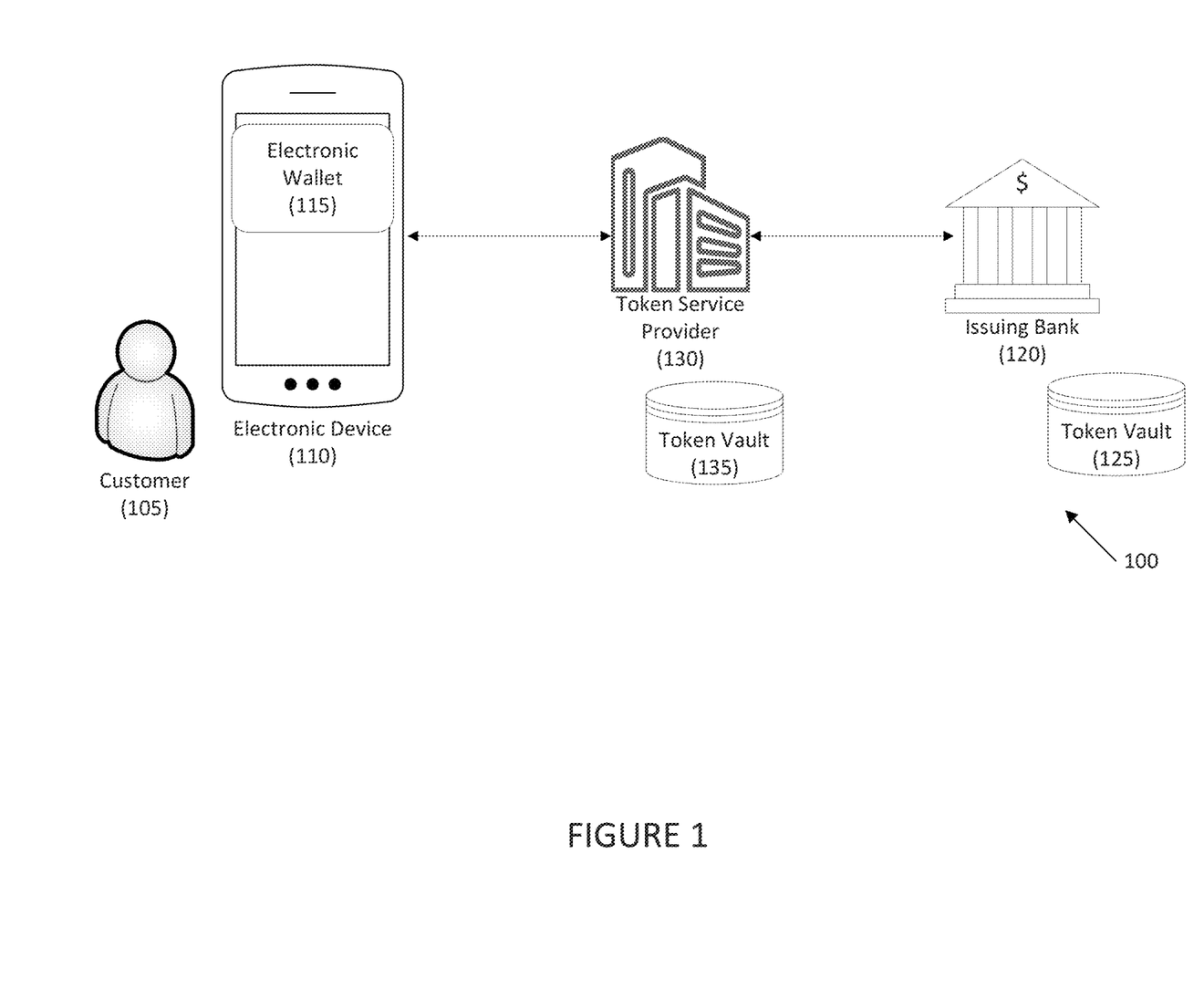
FIG. 1 depicts a system for issuing and using dedicated tokens for rewards accounts according to one embodiment.

FIG. 1 depicts a system issuing and using dedicated tokens for rewards accounts according to one embodiment. System 100 may include customer 105 that may access electronic wallet 115 that may be executed by electronic device 110. Electronic device 110 may be any suitable electronic device, such as smart phones, computers (e.g., desktop, notebook, tablet, etc.), Internet of Things (IOT) appliances, etc.

In one embodiment, electronic wallet 115 may be associated with issuing bank 120. In another embodiment, electronic wallet 115 may be associated with a third party. Electronic wallet 115 may also communicate with token service provider (TSP) 130, which may be, for example, part of the network association (not shown), a third party (not shown), part of issuing bank 120, etc.

In one embodiment, token service provider 130 may issue tokens for financial instruments, rewards accounts, etc. on behalf of issuing bank 120 to electronic wallet 115. Issuing bank 120 and token service provider 130 may each maintain token vaults 125 and 135, respectively, for storing and managing tokens.

Figure 2:
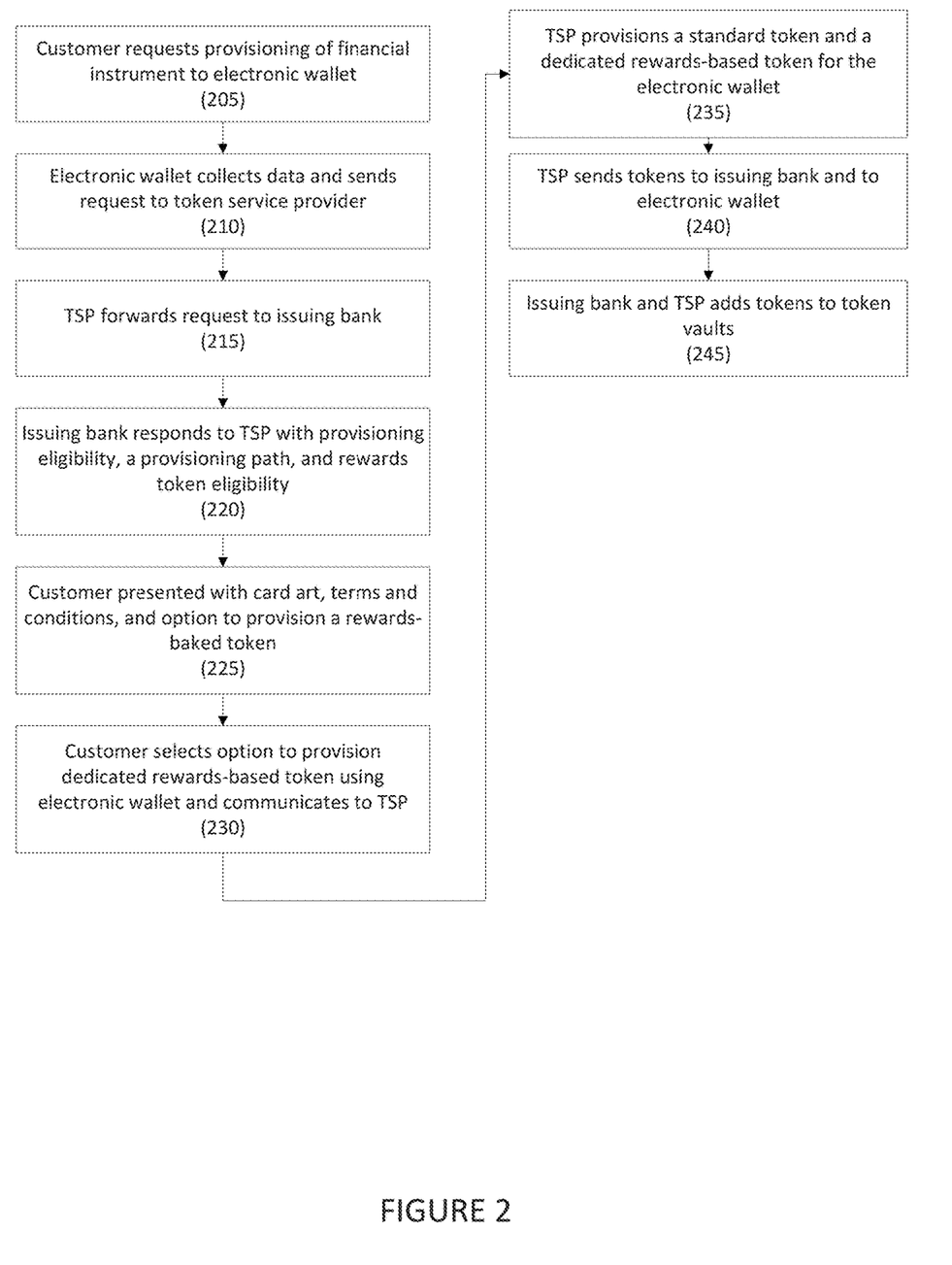
FIG. 2 depicts a method for issuing dedicated tokens for rewards accounts according to one embodiment.

Referring to FIG. 2, a method for issuing dedicated tokens for rewards accounts according to one embodiment.

In step 205, a customer may request adding a financial instrument that is part of a rewards program to an electronic wallet. For example, the customer may select an option to add a card to the electronic wallet.

In step 210, the electronic wallet may collect data, such as card data, and may send a request to a TSP to provision a token for card payments to the electronic wallet. Any suitable manner for receiving the card data may be used as is necessary and/or desired, such as manual entry, image capture, etc.

In step 215, the TSP may acknowledge receipt of the request and may forward the request to the issuing bank for verification and processing.

In step 220, the issuing bank may provide the TSP with provisioning eligibility, a provisioning path, and an indication as to whether the financial instrument is eligible for a dedicated rewards-based token.

In one embodiment, the issuing bank may provide card art to the TSP as necessary.

In step 225, the electronic wallet may present the customer with card art, terms and conditions, and, if the financial instrument is eligible, an option to create a dedicated rewards-based token for payments using rewards associated with the financial instrument.

In step 230, the customer may select the option to create a dedicated rewards-based token using the electronic wallet, and the electronic wallet may communicate the selection to the TSP.

In step 235, the TSP may provision the two tokens for the financial instrument, and in step 240, may provide the two tokens to the issuing bank and to the electronic wallet.

In one embodiment, the TSP may issue tokens out of two different Bank Identification Number (BIN) ranges. For example, one token may be issue from a BIN range for standard credit transactions, and the other token may be issued from a BIN range for rewards-based transactions.

The issuing bank may inform the TSP of the BIN ranges at any point before the TSP issues the tokens.

In another embodiment, the TSP may issue two tokens from the same BIN range and may identify one of the tokens as a secondary token, an alternate token, etc. Any suitable manner of identifying the token as for other than credit or debit transactions, or characterization of the token, may be used as is necessary and/or desired.

In step 255, the issuing bank and the TSP may each add the tokens to their respective token vaults. Each token vault may maintain a mapping between the tokens and the financial instrument. In one embodiment, the issuing bank maps one of the two tokens to the rewards account.

In one embodiment, the issuing bank may include an indicator for one of the tokens indicating that that token is for rewards-based transactions in its token vault. Any suitable field, such as a token type or similar indicator, may be used as is necessary and/or desired.

In embodiments, the tokens and their mappings may be provided to a card network as is necessary and/or desired, and the card network may store the mappings in its token vault. In another embodiment, the TSP and/or issuing bank may synchronize its token vault with the card network's token vault.

In one embodiment, at any suitable point of the provisioning flow, an out of band authentication challenge may be issued to the customer prior to completing the full provisioning process.

Although the process above describes the tokens as provisioned by the TSP, it should be recognized that in alternate embodiments, one or both tokens may be provisioned by the issuing bank and/or by the payment network. For example, the issuing bank may provision both tokens, may provision one token (e.g., the dedicated rewards-based token), etc. Any suitable manner of token provisioning may be used as is necessary and/or desired.

Figure 3:
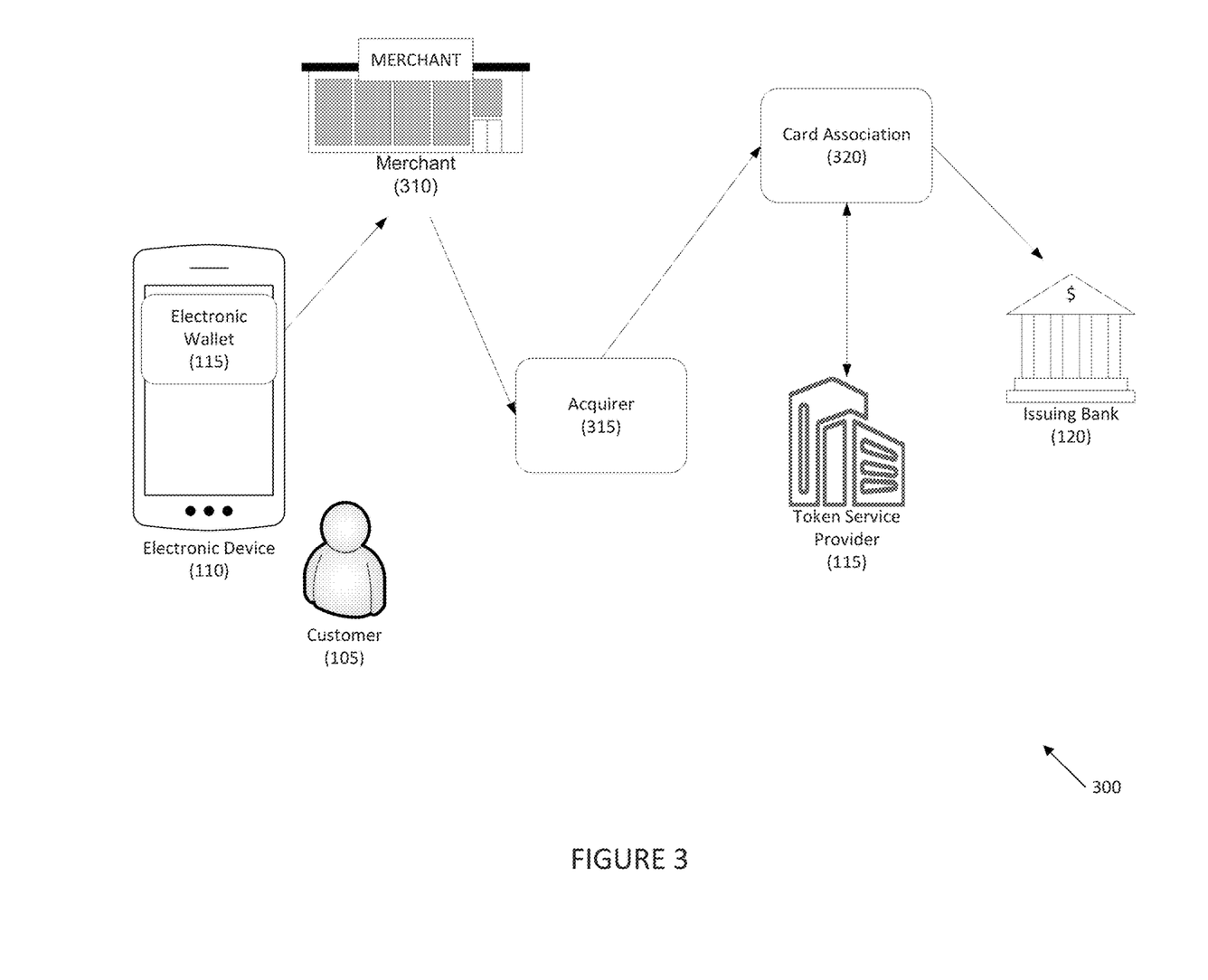
FIG. 3 depicts a system for payment with reward points using dedicated tokens according to another embodiment.

FIG. 3 depicts a system for conducting a transaction with a dedicated reward points-based token according to one embodiment.

In addition to electronic wallet executed by electronic device 110, token service provider 115, and issuing bank 120, system 300 may include merchant 310, acquirer 315, and card association 320.

In one embodiment, token service provider 115 may be part of card association 320.

Figure 4:
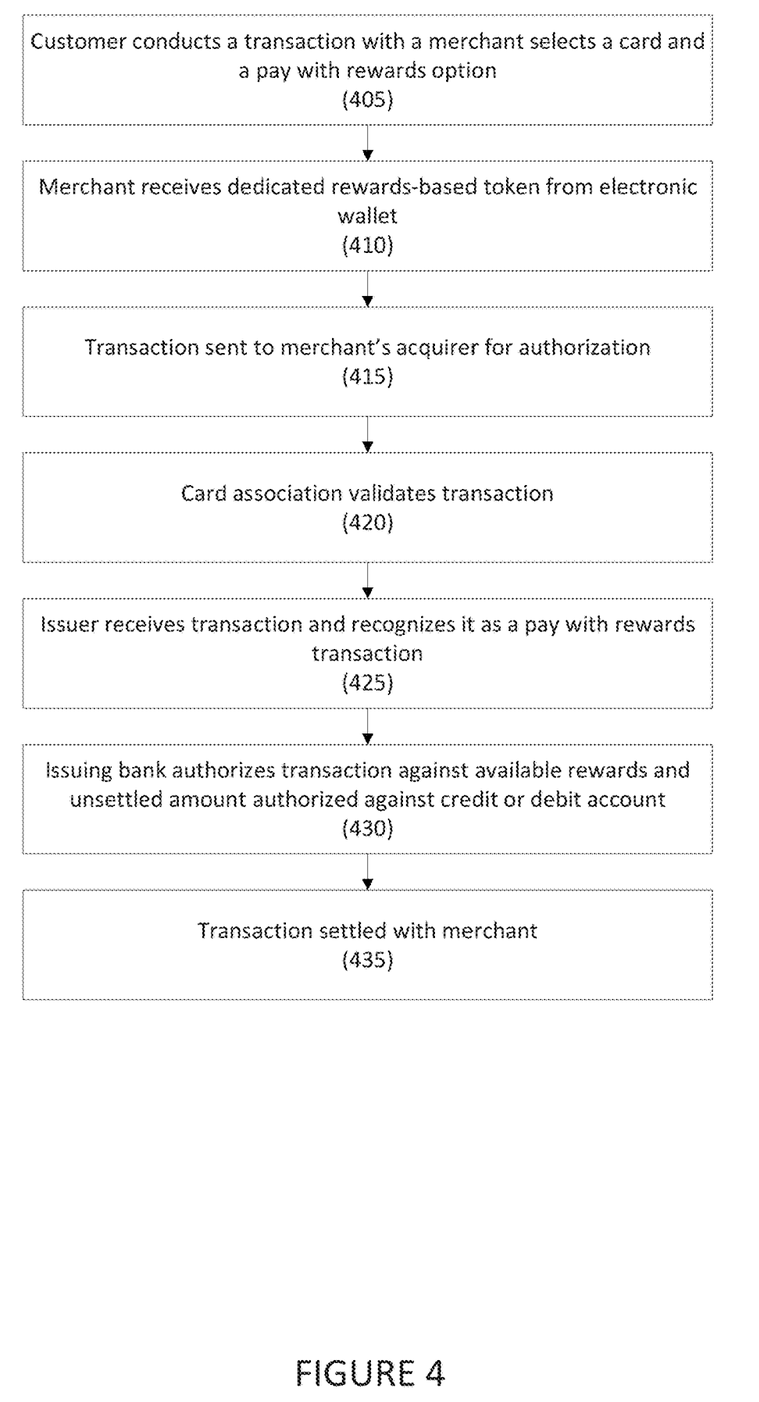
FIG. 4 depicts a method for payment with reward points using dedicated tokens according to another embodiment.

Referring to FIG. 4, a method for conducting a transaction with a dedicated reward points-based token according to one embodiment.

In step 405, a customer preparing to conduct a transaction may authenticate to the electronic wallet, and may select the payment form for the transaction. The customer may select a credit card or debit card, or may select payment using the dedicated rewards-based token. Any suitable interface may be provided.

In one embodiment, the electronic wallet may default to using the dedicated rewards-based token when a certain amount of reward points are available. For example, if the customer has sufficient rewards available to pay for the transaction, a certain percentage of the transaction (e.g., more than half of the value of the transaction), if there is an inventive for using rewards (e.g., there is a promotion with the merchant, for the good/service, etc.), etc., the electronic wallet may default to the rewards-based account, may highlight the dedicated rewards-based token, etc.

In step 410, the merchant point of sale device may interact with the electronic wallet to receive payment credentials. For a reward points-based transaction, the electronic wallet provides the dedicated rewards-based token that was provisioned to the electronic wallet.

In step 415, the transaction may be sent to the merchant's acquirer and processed as a standard authorization. In embodiments, neither the merchant nor the merchant's acquirer is provided with any indication that the transaction is anything other than a business-as-usual transaction; both the merchant and the merchant's acquirer simply receive and pass along the dedicated rewards-based token.

In step 420, the card association may receive the transaction with the dedicated rewards-based token and may validate the transaction. For example, the card association may look up the account number for the dedicated rewards-based token and may add that to the transaction. The transaction may then be provided to the issuing bank.

In embodiments, the card association may retrieve the account number for the dedicated rewards-based token from its token vault, from a token vault for the TSP, etc. The card association may not have any indication that the transaction involves a dedicated rewards-based token.

In one embodiment, the card association may simply provide the transaction with the dedicated rewards-based token to the issuing bank for processing, and the issuing bank may look up the account number for the dedicated rewards-based token from its token vault.

In step 425, the issuing bank may receive the transaction and may identify the transaction as a rewards-based transaction. For example, in one embodiment, the issuing bank may identify the transaction as a rewards-based transaction based on the Bank Identification Number (BIN) that is part of the account number. In another embodiment, the issuing bank may identify the transaction as a rewards-based transaction based on an indicator in the issuing bank's internal token vault.

In step 430, the issuing bank may authorize the transaction against available reward points. Any amount that is unsettled (e.g., the transaction amount remaining after the points balance is used) is authorized against the credit or debit account "open to buy". The transaction response is then sent back to the association as normal.

In one embodiment, risk rules and transaction processing may process in the same manner as with a standard transaction. In another embodiment, the risk and/or fraud rules may be enhanced for reward points-based transactions.

In step 435, the transaction may be settled in the same manner as a standard transaction. For example, the merchant will receive the appropriate transaction amount minus any applicable interchange fees.

In step 440, the customer may see the reward points-based transaction on a statement or transaction view. For example, the transaction may be identified as a fully-funded reward points transaction, or a split transaction between reward points deduction and available balance draw down.

In one embodiment, fraud and chargebacks may function the same as with a standard transaction. In one embodiment, the issuing bank may choose to apply fraud or refund credits back to the customer accounts as either reward points, cash, or a combination of the two.

In another embodiment, a system and method for rewards consolidation to a single reward or card instrument is provided according to one embodiment. For example, a customer may have several reward-earning cards and may be earning rewards on each card, but cannot use all of them for a single purchase, or in the manner that the customer wants to use them.

In one embodiment, a reward or point card is provided according to one embodiment. For example, a customer may have rewards spread among several accounts. Embodiments may facilitate the consolidation of reward points from multiple accounts so that the reward points may be used with any suitable method of payment and with any suitable merchant.

In one embodiment, the reward points may be from bank cards, co-brand cards, merchant and third-party accounts. In one embodiment, once consolidated, the reward points may be used with a transaction card (e.g., plastic), for ATM withdrawals, for NFC transactions (e.g., Apple Pay, Samsung Pay, etc.), for credit card on file transactions, with third parties (e.g., PayPal, Zelle, etc.).

In embodiments, a customer may have the option to automatically move all rewards earning across various programs into the consolidated product, or the customer may move them manually. In one embodiment, a conversion rate between various rewards programs may be applied during transfers. For example, a rules engine may be used to convert and transfer reward points, as well as to add reward points to the consolidated product.

In one embodiment, a centralized rewards points bank may consolidate reward points from one or more internal reward points-based products as well as for one or more external reward points-based products. The centralized reward points bank may be accessible to an authorization platform for an issuing financial institution for transaction processing.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for issuing dedicated tokens for reward accounts, comprising:
   receiving, by a computer program executed by an information processing apparatus comprising at least one computer processor and from an electronic wallet, a request to provision a credit or debit-based token for a financial instrument and a dedicated reward-based token for rewards-based transactions also associated with the financial instrument to an electronic wallet;
   generating, by the computer program, the credit or debit-based token for the financial instrument and the dedicated reward-based token associated with the financial instrument, wherein the credit or debit-based token and the dedicated reward-based token each have a different Bank Identification Number (BIN);
   providing, by the computer program, both the credit or debit-based token and the dedicated reward-based token to the electronic wallet;
   receiving, by the computer program and from a card association, a transaction authorization for a pending transaction with a merchant comprising a received token from the electronic wallet, wherein the received token does not comprise an indicator that identifies the received token as the dedicated rewards-based token to the merchant;
   identifying, by the computer program, the received token as the dedicated reward-based token;
   authorizing, by the computer program, the pending transaction against available reward points for a rewards account associated with the financial instrument; and
   completing, by the computer program, the transaction using the available reward points.

2. The method of claim 1, wherein the request to provision the credit or debit-based token and the dedicated reward-based token for rewards-based transactions to an electronic wallet comprises a first request to provision the credit or debit-based token for transactions with the financial instrument and a second request to provision the dedicated reward-based token for rewards-based transactions associated with the financial instrument.

3. The method of claim 2, wherein the first request comprises an account number for the financial instrument.

4. The method of claim 3, further comprising:
   determining, by the computer program, an indication that the financial instrument is eligible for the dedicated reward-based token.

5. The method of claim 1, wherein the BIN for the dedicated reward-based token identifies the account as a rewards account.

6. The method of claim 1, further comprising:
   storing, by the computer program, a mapping of the credit or debit-based token and the dedicated reward-based token to the financial instrument.

7. The method of claim 1, wherein the dedicated reward-based token is identified as a secondary token.

8. The method of claim 7, further comprising:
   storing, by the computer program, an indicator with the dedicated reward-based token to the financial instrument in a second token vault, wherein the indicator identifies the dedicated reward-based token.

9. The method of claim 1, further comprising:
charging, by the computer program, the transaction against the available reward points.

10. The method of claim 9, further comprising:
charging, by the computer program, a remaining balance after applying the available rewards points to the financial instrument.

11. The method of claim 1, wherein the computer program identifies the received token as the dedicated rewards-based token based on an identifier stored in a token vault.

12. A non-transitory computer readable storage medium, including instructions stored thereon, which when read and executed by one or more computer processors, cause the one or more computer processors to perform steps comprising:
receiving, from an electronic wallet, a request to provision a credit or debit-based token for a financial instrument and a dedicated reward-based token for rewards-based transactions also associated with the financial instrument to the electronic wallet;
generating the credit or debit-based token for the financial instrument and the dedicated reward-based token associated with the financial instrument, wherein the credit or debit-based token and the dedicated reward-based token each have a different Bank Identification Number (BIN);
providing both the credit or debit-based token and the dedicated reward-based token to the electronic wallet;
receiving, from a card association, a transaction authorization for a pending transaction with a merchant comprising a received token from the electronic wallet, wherein the received token does not comprise an indicator that identifies the received token as the dedicated rewards-based token to the merchant;
identifying the received token as the dedicated reward-based token;
authorizing the pending transaction against available reward points for a rewards account associated with the financial instrument;
and
completing the transaction using the available reward points.

13. The non-transitory computer readable storage medium of claim 12, wherein the request to provision the credit or debit-based token and the dedicated reward-based token for rewards-based transactions to an electronic wallet comprises a first request to provision the credit or debit-based token for transactions with the financial instrument and a second request to provision the dedicated reward-based token for rewards-based transactions associated with the financial instrument.

14. The non-transitory computer readable storage medium of claim 13, wherein the first request comprises an account number for the financial instrument.

15. The non-transitory computer readable storage medium of claim 14, further including instructions stored thereon, which when read and executed by one or more computer processors, cause the one or more computer processors to determine an indication that the financial instrument is eligible for the dedicated reward-based token.

16. The non-transitory computer readable storage medium of claim 12, wherein the BIN for the dedicated reward-based token identifies the account as a rewards account.

17. The non-transitory computer readable storage medium of claim 12, further including instructions stored thereon, which when read and executed by one or more computer processors, cause the one or more computer processors to store a mapping of the credit or debit-based token and the dedicated reward-based token to the financial instrument.

18. The non-transitory computer readable storage medium of claim 12, wherein the dedicated reward-based token is identified as a secondary token.

19. The non-transitory computer readable storage medium of claim 18, further including instructions stored thereon, which when read and executed by one or more computer processors, cause the one or more computer processors to store an indicator with the dedicated reward-based token to the financial instrument in a second token vault, wherein the indicator identifies the dedicated reward-based token.

20. The non-transitory computer readable storage medium of claim 12, further including instructions stored thereon, which when read and executed by one or more computer processors, cause the one or more computer processors to charge the transaction against the available reward points, and to charge a remaining balance after applying the available rewards points to the financial instrument.

* * * * *